Patented Feb. 22, 1938

2,108,940

UNITED STATES PATENT OFFICE 2,108,940

PROCESS FOR MAKING DI-CALCIUM PHOSPHATE

Walter H. MacIntire, Knoxville, Tenn.

No Drawing. Application May 3, 1934,
Serial No. 723,807

11 Claims. (Cl. 23—109)

This invention relates to the manufacture of di-calcium ortho-phosphate, $CaHPO_4.2H_2O$, and has for its object to produce such di-calcium phosphate of a high grade of purity in less time and at a greatly reduced cost for labor and material as compared with processes heretofore in use. Di-calcium phosphate has heretofore been produced as a by-product from the manufacture of glue, the bone used in the glue industry being dissolved in hydrochloric acid to which a solution-suspension of calcium hydroxide is added in proportions required to throw out di-calcium phosphate. This product is known as "precipitated bone" and has been used as phosphatic fertilizer. Di-calcium phosphate, intended primarily as cattle-feed supplement, has also been produced by effecting a hydrochloric acid solution of incinerated phosphate rock, and filtering such solution and treating it with sprays of "milk of lime". The precipitated material must then be filtered, or centrifuged and dried.

One of the distinct advantages of the present invention is the elimination of the steps of either filtration or centrifuging and the necessary drying required in the present methods. The use of limestone instead of milk of lime permits the use of a cheap raw product with a minimal and optimal quantity of water and an evolution of gas to maintain a granular material that "works" during the short period of curing required to bring the final product to the desired composition.

Di-calcium phosphate produced by such hydrochloric acid processes is designated by the Association of Official Agricultural Chemists as "Precipitated Phosphate", and is defined as "A product consisting mainly of di-calcium phosphate obtained by neutralizing with calcium hydroxide the acid solution of either phosphate rock or processed bone".

According to the present invention comminuted high-calcic material such as limestone, marble, or marl, preferably of a purity of 98% or better, is subjected to the action of a highly concentrated phosphoric acid solution, water to the extent of from 25% to 50% by weight of the calcareous material employed being added and the whole subjected to vigorous agitation. Preferably the phosphoric acid ($H_3PO_4$) employed has an initial concentration of approximately 85%, and the water employed in the process may be added simultaneously with the comminuted calcareous material, or it may be added to the phosphoric acid before the comminuted calcareous material is introduced thereinto. If the phosphoric acid used is produced by the wet process the acid can be concentrated to the preferred range indicated. Although a variety of high-calcic materials may be employed, it is preferred to use limestone, marble, or marl of a purity of 98% or better, and to comminute the same so as to pass through a 100-mesh sieve. The process may be carried out in a closed container to insure the recovery of liberated carbon dioxide, or it may be carried out in an open mixing chamber for single or unit batch production. Moreover, the process may be carried out in a continuous mixer, but whether in a single batch or a continuous mixer, it is essential that suitable stirring or mixing equipment be provided.

When using a chamber in which a unit batch is to be produced, the following is the preferred procedure:

Phosphoric acid of approximately 85% concentration is introduced into the mixing chamber, and there is simultaneously added thereto comminuted high grade (98% or better) limestone and water, and the whole mass subjected to vigorous agitation and mixing. The limestone should be approximately in an amount sufficient to combine with the phosphoric acid employed to form di-calcium phosphate ($CaHPO_4.2H_2O$), that is in the ratio of 300 parts of $CaCO_3$ and 294 parts of $H_3PO_4$ and the amount of water added to the concentrated acid that contains the requisite quantity of $H_3PO_4$ may range between 25% and 50% of the weight of the limestone charge. Preferably when 85% $H_3PO_4$ is used, the water added should be about 35% by weight of the limestone charge. It has been found that when water is added to the 85% phosphoric acid along with the limestone in amounts as small at 25% by weight of the limestone charge, a relatively dry product of good physical condition is quickly obtained; but an undue amount of water-soluble phosphate remains, and the dry conditon of the product is such that the ultimate and desired effect of practically complete transition to di-calcium phosphate is not so rapid as that secured by the larger addition of water.

The addition of water may be made, in part or total, directly to the phosphoric acid previous to rather than simultaneously with the introduction of the limestone, in which case the water added should be such as to produce a concentration of $H_3PO_4$ ranging from 60% to 70%. The water addition, however, should not be carried to the point where the initial concentration is such as to cause a too violent chemical reaction or too great a volume of the reacting mixture. The preferred dilution is that which will produce a concentration of the phosphoric acid of from 65% to 70%. A lower concentration of acid may be utilized but the immediate resultant mixture is then thinner than the desired granular condition and a large quantity of water must be dispelled either by prolonged curing or heat drying, the final product in either case being of an undesirable fineness and even pulverulence. With a phosphoric acid solution of from 65% to 70% and with vigorous agitation during the rapid addition of the limestone, there is no great increase in the volume of the mixture and no decided increase in temperature. The mixture will appear quite dry during the first two or three minutes of mixing, and this condition will be followed by an apparent increase in free water and a more liquid mixture during the succeeding three or four minutes, after which the mixture begins to granulate, and at the end of the total mixing period of approximately ten minutes the granulated product can be delivered easily from the mixer to the storage bin or drier. It may then be permitted to stand to be "cured" at room temperature, to dry further and to permit practically complete transitions to ensue, or it may be dried immediately at a low temperature of from 50° to 65° C. In either case the product obtained can be easily ground to the desired fineness.

When practicing the process in a continuous mixer, it is necessary (1) that the acid that reacts with the limestone in the mixing chamber be sufficiently concentrated, 65% to 70%, to give a mass so dense that the evolved $CO_2$ will not give to the mixture an undesirable gas distention, or excessive volume; (2) that the flow of limestone and the flow of acid in the mixing chamber be so regulated as to bring the prescribed proportions of limestone and acid (300 parts of $CaCO_3$ and 294 parts of $H_3PO_4$) simultaneously into reaction; (3) that the gravity flow of the limestone and acid in the mixing chamber be accompanied by vigorous agitation to insure intimate mixing and to minimize frothing. The optimal concentration of the phosphoric acid will be governed by the foregoing factors and also by the type of the mechanism employed to discharge the product from the mixing chamber. A long, supplementary tunnel provided with a worm-type conveyor-mixer is desirable to insure an extended period of mixing, during which extensive reaction between the initially-formed mono-calcium phosphate and the undecomposed fraction of the limestone charge ensues, and hydration of the resultant di-calcium phosphate proceeds. It has been found that the three successive steps that involve first the production of mono-calcium phosphate and secondly di-calcium phosphate, and thirdly the hydration of the latter, can be carried almost to completion during the combined treatment-operation and the relatively short-curing period, so brief as 24 hours.

It will be found that the product obtained by the practice of the process herein set forth contains only small quantities of mono-calcium phosphate and nugatory limestone residues, the product being equivalent to 95% or more of di-calcium phosphate, approximately 85% of which will be in a di-hydrate $CaHPO_4.2H_2O$ form, with a minor occurrence of the anhydrous material $CaHPO_4$. The material is a snow white non-caking free-flowing product of high purity and is characterized by almost complete absence of fluorine, which element is known to be detrimental when present in cattle-feed supplements.

The product contains approximately 2½ times as much $P_2O_5$ as the present standard superphosphate and has the advantage of being non-acid forming and of basic reaction in the soil. Furthermore, not being water-soluble, although completely "available", the product has the advantage that it is not likely to be "fixed" immediately and extensively by the iron and aluminum content of the soil.

Having thus described the invention, what is claimed is:

1. The process of making di-calcium orthophosphate of approximately 95% purity which consists in adding to an approximately 85% phosphoric acid solution an amount of approximately pure limestone comminuted to pass a 100 mesh sieve in the approximate proportion of 294 parts of $H_3PO_4$ and 300 parts of $CaCO_3$, together with water amounting by weight to from 25% to 50% of the limestone and vigorously agitating the mixture to a granular condition.

2. The process of making di-calcium orthophosphate of approximately 95% purity which consists in mixing phosphoric acid of from 60% to 70% concentration with limestone comminuted to pass a 100 mesh sieve, in the proportion of 294 parts of $H_3PO_4$ and 300 parts of $CaCO_3$, and agitating the mixture to a granular condition.

3. The process of making di-calcium orthophosphate of approximately 95% purity which consists in mixing phosphoric acid and calcium carbonate material substantially all of which will pass a 100 mesh sieve in the proportion prescribed in claim 1, together with water, the amount of water being from 25% to 50% by weight of the calcareous material and agitating the mixture to a granular condition.

4. The process of making di-calcium orthophosphate of approximately 95% purity which consists in mixing phosphoric acid of from 60% to 70% concentration with calcium carbonate material comminuted to pass a 100 mesh sieve in the proportion prescribed in claim 1 and agitating the mixture to a granular condition.

5. The process of making di-calcium orthophosphate of approximately 95% purity which consists in mixing phosphoric acid of approximately 85% concentration with calcium carbonate material comminuted to pass a 100 mesh sieve in the proportions prescribed in claim 1, and simultaneously adding water amounting by weight to at least 25% of the calcareous material and agitating the mixture to a granular condition.

6. The process of making di-calcium orthophosphate of approximately 95% purity which consists in mixing phosphoric acid of approximately 85% concentration with calcium carbonate material comminuted to pass a 100 mesh sieve in the proportion prescribed in claim 1 and simultaneously adding water amounting by weight to at least 25% of the calcareous material, agitating the mixture to a granular condition, and then permitting the mixture to stand to complete the reactions.

7. The process of making di-calcium orthophosphate of approximately 95% purity which consists in mixing phosphoric acid of from 60% to 70% concentration with limestone comminuted to pass a 100 mesh sieve in the proportion prescribed in claim 1, agitating the mixture to a granular condition, and then permitting the mixture to stand to complete the reactions.

8. The process of making di-calcium orthophosphate of approximately 95% purity which consists in mixing phosphoric acid of approximately 85% concentration with calcium carbonate material comminuted to pass a 100 mesh sieve in the proportion prescribed in claim 1 and simultaneously adding water amounting by weight to at least 25% of the calcareous material, agitating the mixture to a granular condition, and then permitting the mixture to cure.

9. The process of making di-calcium orthophosphate of approximately 95% purity which consists in mixing phosphoric acid of approximately 85% concentration with calcium carbonate material comminuted to pass a 100 mesh sieve in the proportion prescribed in claim 1 and simultaneously adding water amounting by weight to at least 25% of the calcareous material, agitating the mixture to a granular condition, and then heat-drying the mixture.

10. The process of making di-calcium orthophosphate of approximately 95% purity which consists in mixing phosphoric acid of from 60% to 70% concentration with limestone comminuted to pass a 100 mesh sieve, in the proportion prescribed in claim 1, agitating the mixture to a granular condition, and then heat-drying the mixture.

11. The process of making di-calcium orthophosphate of approximately 95% purity which consists in mixing phosphoric acid of approximately 85% concentration with calcium carbonate material comminuted to pass a 100 mesh sieve in the proportion prescribed in claim 1 and simultaneously adding water amounting by weight to at least 25% of the calcareous material, agitating the mixture to a granular condition, and then heat-drying the mixture.

WALTER H. MacINTIRE.